(12) United States Patent
Ahn et al.

(10) Patent No.: US 9,530,168 B2
(45) Date of Patent: Dec. 27, 2016

(54) REDUCING CHURN RATE FOR A SOCIAL NETWORK SERVICE

(71) Applicant: LinkedIn Corporation, Mountain View, CA (US)

(72) Inventors: Junghoon (Andrew) Ahn, Cupertino, CA (US); Venu Javarappa, San Jose, CA (US); Lizabeth Li, Mountain View, CA (US); Yurong Shi, San Jose, CA (US)

(73) Assignee: LinkedIn Corporation, Sunnyvale, CA (US)

( * ) Notice: Subject to any disclaimer, the term of this patent is extended or adjusted under 35 U.S.C. 154(b) by 354 days.

(21) Appl. No.: 13/892,117

(22) Filed: May 10, 2013

(65) Prior Publication Data

US 2014/0297673 A1 Oct. 2, 2014

Related U.S. Application Data

(60) Provisional application No. 61/806,345, filed on Mar. 28, 2013.

(51) Int. Cl.
*G06F 17/30* (2006.01)
*G06Q 50/00* (2012.01)
*G06Q 10/10* (2012.01)

(52) U.S. Cl.
CPC .............. *G06Q 50/01* (2013.01); *G06Q 10/10* (2013.01)

(58) Field of Classification Search
CPC ................... G06F 17/30861; G06F 17/30867; G06F 10/10; G06F 50/01
See application file for complete search history.

(56) References Cited

U.S. PATENT DOCUMENTS

| 8,214,253 | B1 * | 7/2012 | Harris et al. | 705/14.1 |
|---|---|---|---|---|
| 2010/0064040 | A1 * | 3/2010 | Wise et al. | 709/224 |
| 2010/0121916 | A1 * | 5/2010 | Lin | 709/203 |
| 2010/0145771 | A1 * | 6/2010 | Fligler et al. | 705/10 |
| 2012/0231781 | A1 * | 9/2012 | Kumar et al. | 455/422.1 |
| 2013/0013689 | A1 * | 1/2013 | Crawford | 709/204 |

* cited by examiner

*Primary Examiner* — Shiow-Jy Fan
(74) *Attorney, Agent, or Firm* — Schwegman Lundberg & Woessner, P.A.

(57) ABSTRACT

Systems and methods for reducing a churn rate associated with subscribers of social network services are described. In some example embodiments, the systems and methods may access activity information associated with a former subscriber of a social network service, compare the accessed activity information to activity information associated with subscribers of the social network service, identify one or more differences between the activity information associated with the former subscriber of the social network service and the activity information associated with the subscribers of the social network service, and perform an action based on the identified one or more differences.

20 Claims, 8 Drawing Sheets

REDUCING CHURN RATE FOR A SOCIAL NETWORK SERVICE

CROSS REFERENCE TO RELATED APPLICATIONS

This application claims priority to U.S. Provisional Patent Application No. 61/806,345, filed on Mar. 28, 2013, entitled REDUCING CHURN RATE FOR A SOCIAL NETWORK SERVICE, which is hereby incorporated by reference in its entirety.

TECHNICAL FIELD

The present disclosure generally relates to data processing techniques for a subscription-based service. More specifically, the present disclosure relates to methods, systems and computer program products for reducing churn and/or improving retention of subscribers within a social network service.

BACKGROUND

Churn rate measures a number of individuals that leave a group or other collection over a certain period of time, such as a number of subscribers that leave a subscription-based service. Churn, therefore, is similar to attrition, and may be the opposite of retention. For example, a subscriber-based service model may succeed when subscriber churn is low (and retention is high), and may fail when subscriber churn is high (and retention is low), among other things.

Industries that rely on subscription-based service models, such as the cable television industry, the cell phone industry, web-based services, and so on, spend a considerable amount of time, money, and effort attempting to identify reasons why their subscribers churn, in order to provide retention incentives to subscribers that keep them from ending use of provided services. However, their efforts often lack insight or are driven by information received directly from subscribers or from simple metrics, which may lead to ineffective results and unsuccessful determinations as to why subscribers are not being retained, among other problems.

DESCRIPTION OF THE DRAWINGS

Some embodiments of the technology are illustrated by way of example and not limitation in the figures of the accompanying drawings, in which.

DETAILED DESCRIPTION

Overview

The present disclosure describes methods, systems, and computer program products, which individually provide functionality for reducing a churn rate for a social network service, such as by determining churn probabilities for subscribers and/or other members of the social network service.

For example, the systems and methods may access activity information associated with a former subscriber of a social network service, compare the accessed activity information to activity information associated with subscribers of the social network service, identify one or more differences between the activity information associated with the former subscriber of the social network service and the activity information associated with the subscribers of the social network service, and perform an action based on the identified one or more differences, such as an action that assists with retaining or renewing the former subscriber to the social network service, among other things.

As another example, the systems and methods may receive and/or access input identifying a subscriber of a social network service, determine a churn or attrition probability for the subscriber of the social network service, and perform an action based on the determined churn probability, such as an action to reduce the churn probability for the subscriber, among other things.

Thus, by utilizing information retrieval and analysis techniques, a social network service may accurately identify and reduce the churn rate associated with subscribers of subscription-based services provided by the social network service, enabling the social network service to increase revenues associated with the provided services, provide better and more targeted services to its subscribers and other members, and so on.

In the following description and for purposes of explanation, numerous specific details are set forth in order to provide a thorough understanding of the various aspects of different embodiments of the present invention. It will be evident, however, to one skilled in the art, that the present invention may be practiced without all of the specific details.

Other advantages and aspects of the inventive subject matter will be readily apparent from the description of the figures that follows.

Suitable System

Figure 1:
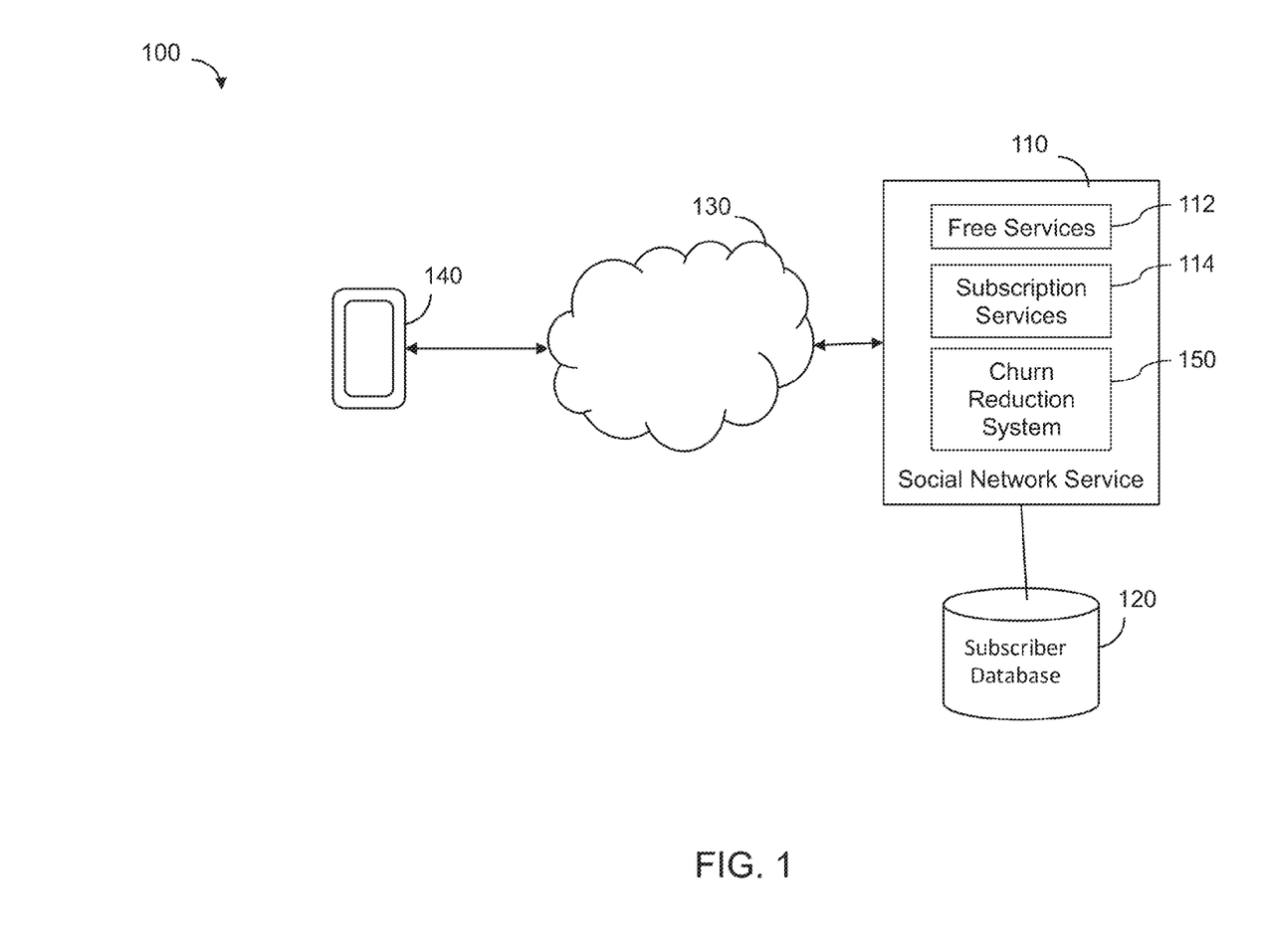
FIG. 1 is a block diagram illustrating an example of a network environment including a server operating a system for reducing a churn rate for a social network service, consistent with some embodiments.

FIG. 1 is a block diagram illustrating an example of a network environment 100 including a server operating a system for reducing a churn rate for a social network service, consistent with some embodiments.

The network environment 100 includes a user device 140, such as a mobile device or other computing device, which accesses a social network service 110 over a network 130. The social network service 110 may support and/or provide a professional social network or any social network that includes members, where a member is connected to, friends with, or otherwise affiliated with some of the other members of the network 130. Thus, in some examples, the social network service 110 includes a social graph that stores data identifying relationships between members of the social network. For example, social graph data may indicate one member is a $1^{st}$ degree connection with another member when the members are directly connected, may indicate one member is a $2^{nd}$ degree connection with another member when the members are indirectly connected via a third member (i.e., each of the members are directly connected to a third member but not directly connected to each other), and so on.

In various example embodiments, one or more portions of the network 130 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, any other type of network, or a combination of two or more such networks. The user device 140 may be any suitable computing device, such as a smart phone, a tablet, a laptop, gaming device, and/or any mobile device or computing device configured to view services and other information provided by the social network service 110 and receive selections from users of objects displayed by webpages, emails, and/or apps, among other things.

The social network service 110 may provide, via a supported social network, one or more free services 112 and/or one or more subscriber-based services 114, such as enhanced or additional services that are accessed by user devices 140 associated with paying and/or other subscribers of the services.

For example, the social network service 110 may provide the following free or non-subscription services 112 over the network 130 to a member associated with the user device 140:

Basic social functionality within a supported social network, such as the ability to view limited profile information for non-connections;

Basic navigation and activities within the supported social network, such as access to a limited amount of analytics, the ability to send a limited number of messages to other members (e.g., non-connections); access to some or no analytics; and so on.

In contrast, the social network service 110 may, for example, provide the following subscription-based services 114 over the network 130 to a member associated with the user device 140:

Enhanced social functionality within the supported social network, such as access to complete profiles for all members of the social network;

Enhanced navigation and other activities within the supported social network, such as access to analytics associated with members of the social network, analytics associated with messaging the members, activities of the members within the social network, activities associated with actions performed within the social network; and so on.

As an example, a non-subscriber member of a professional social network may receive free services 112 such as services associated with viewing complete profiles for connections within the social network and sending messages to other connections, and so on. On the other hand, a subscriber member of the professional social network may receive subscription services 114 not provided to the non-subscriber, such as services associated with viewing the complete profiles of all members of the social network (e.g., connections and non-connections), services associated with enhanced search and navigation capabilities within the social network, services associated with sending messages to any members, and so on.

A social network is a useful place in which to obtain various types of information associated with services provided to members, such as subscription-based services 114, along with activities performed by the members. Often, a social network or other similar site, such as LinkedIn, Facebook, Google+, Twitter, and so on, stores various types of information or attributes associated with members of the site as member profile information. For example, a friend-based social networking service may store interest information for a member (e.g., information about things a member "likes") in the member's profile, whereas a professional-based social networking site may store accomplishment or experience information for a member (e.g., educational or work experience information) in the member's profile, as well as activity information attributed to the members of the social networks.

Thus, the social network service 110 may contain, store, and/or have access to (e.g., via a third party site) various types of member activity information, such as information stored within the subscriber database 120. The subscriber database 120 may include information associated with members of the social network service 110, such as profile information, social graph information, activity information, and so on.

For example, the subscriber database 120 may store information associated with the activities of members, such as the activities performed by members of the social network within a supported social network. Example activity information stored for members of a social network may include:

Activity information associated with viewing profiles of other members within the social network, such as information identifying a number of profile views, demographic information associated with the viewed profiles, and so on;

Activity information associated with performing searches within the social network, such as information identifying a number of performed searches, information identifying the search terms and/or results, and so on;

Activity information associated with messages sent within and/or out of the social network, such as information identifying a number of sent messages, information identifying the recipients of the messages, and so on;

Activity information associated with performing analytics within the social network, such as a number of performed analyses, the type of analyses, and so on;

Activity information associated with generating and/or consuming content within the social network, such as information identifying the type of content generation (e.g., placing a job posting, posting a photo or link, entering a status update or blog post) and/or consumption (viewing a job posting, viewing a photo or navigating to a posted link, viewing a company or member profile); and so on.

The social network service 110, in some example embodiments, may leverage such information in order to identify certain activities and/or other actions performed by members of a social network that are retained as subscribers of subscription services 114 provided by the social network. Such subscribers may be considered non-churners, or subscribers that maintain subscriptions to subscription-based services 114 between one time period to another (e.g. from a first month to a second month). On the other hand, subscribers that attrite or end subscriptions to subscription-based services 114 between one time period to another may be considered churners.

Thus, in order to leverage and/or utilize the information contained in the subscriber database 120, such as the activity information associated with subscribers of subscription services 114, the social network service 110 may support and/or employ a churn reduction system 150 that uses machine learning to reduce churn rates (e.g., attrition rates) associated with subscribers of the subscription services 114 provided by the social network service 110, among other things.

Reducing Churn Rate for a Social Network Service

Figure 2:
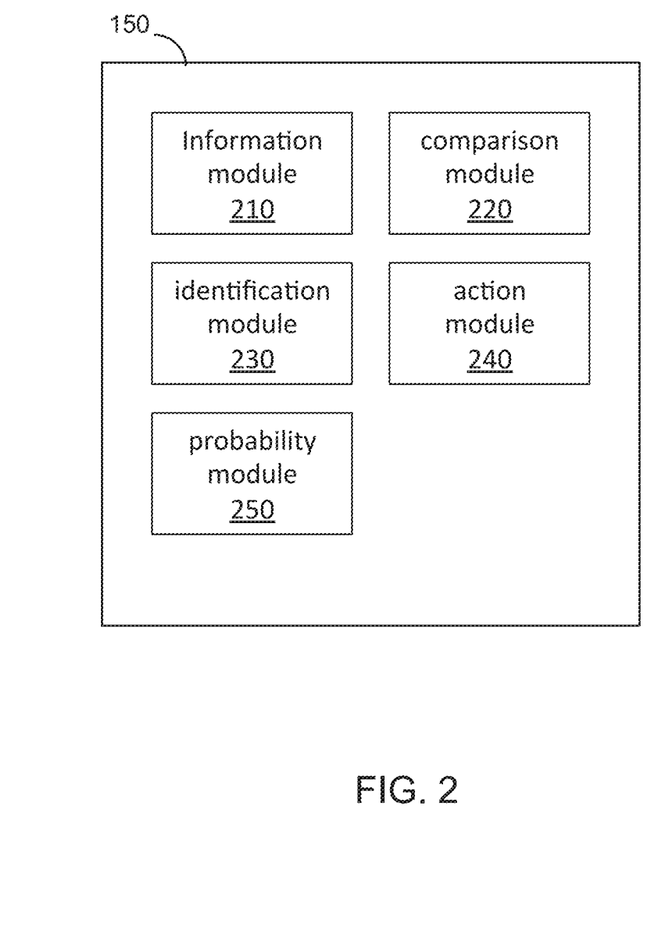
FIG. 2 is a block diagram illustrating modules of a churn reduction system, consistent with some embodiments.

As described herein, in some example embodiments, the churn reduction system 150 utilizes various types of data or other information stored by a social network service 110 in order to reduce a churn rate associated with subscribers of the social network service 110, such as subscribers of one or more services provided by the social network service 110. FIG. 2 is a block diagram illustrating modules of a churn reduction system, consistent with some embodiments.

As illustrated in FIG. 2, the churn reduction system 150 includes a variety of functional modules. One skilled in the art will appreciate that the functional modules are implemented with a combination of software (e.g., executable instructions or computer code) and hardware (e.g., at least a memory and processor). Accordingly, as used herein, in some embodiments a module is a processor-implemented module and represents a computing device having a processor that is at least temporarily configured and/or programmed by executable instructions stored in memory to perform one or more of the particular functions that are described herein.

Referring to FIG. 2, the churn reduction system 150 includes an information module 210, a comparison module 220, an identification module 230, an action module 240, and a probability module 250.

In some example embodiments, the information module 210 is configured and/or programmed to access information associated with a former subscriber of a social network service 110. For example, the information module 210 may access activity information associated with a former subscriber, or churner, of a subscription service 114 provided by the social network service 110. Example accessed activity information may include activity information associated with a number of searches performed by the former subscriber during a subscription period, a number of viewed profiles during the subscription period, a number of messages sent during the subscription period, and so on.

In some example embodiments, the comparison module 220 is configured and/or programmed to compare the accessed activity information to activity information associated with subscribers of the social network service 110. For example, the comparison module 220 may compare the activity information of the former subscriber to other subscribers, or non-churners, that retained subscriptions to the subscription service 114 provided by the social network service 110.

In some cases, the comparison module 220 may compare a number of searches performed by the former subscriber within the social network service 110 to an average number of searches performed by current or retaining subscribers of the social network service 110, may compare a number of profiles visited by the former subscriber within the social network service 110 to an average number of profiles visited by the current or retaining subscribers of the social network service 110, among other activity types described herein.

In some example embodiments, the comparison module 220 may select a group of cohorts to the former subscriber with which to perform the comparison of activities. For example, the comparison module 220 may consider subscribers as cohorts to the former subscriber when they are associated with a similar or same initial time period of beginning a subscription to a service (e.g., the same initial month as a subscriber to a service), when they are associated with a similar or same professional group or organization (e.g., both members are job search or human resource professionals), when they are associated with a similar or same subscription to a service or services, and so on.

In some example embodiments, the identification module 230 is configured and/or programmed to identify one or more differences between the activity information associated with the former subscriber of the social network service 110 and the activity information associated with the subscribers of the social network service 110. For example, the identification module 230 may identify and/or determine activities performed by non-churners of the social network service 110 that were not performed, or not performed to a certain performance level, by the former subscriber.

The identification module 230, therefore, may (1) identify an activity that was performed by the subscribers of the social network service 110 during an initial subscription time period, and was not performed by the former subscriber of the social network service 110 during the initial subscription time period, and/or (2) may identify an activity that was performed at a certain performance level by the subscribers of the social network service 110 during an initial subscription time period and was not performed at the certain performance level by the former subscriber of the social network service 110 during the initial subscription time period, among other things.

Figure 3:
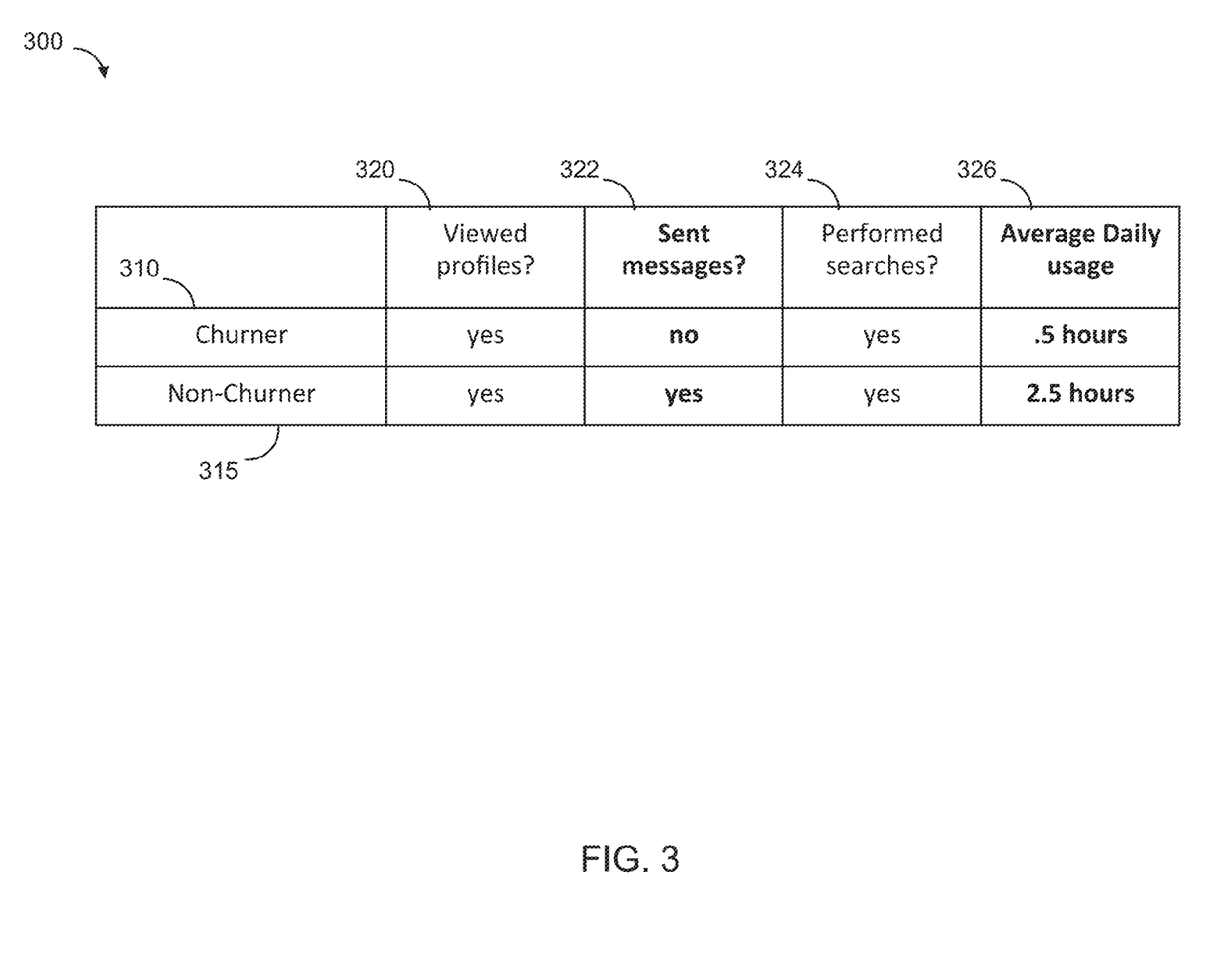
FIG. 3 is a schematic diagram illustrating an example comparison between a churner and a collection of non-churners, consistent with some embodiments.

For example, FIG. 3 is a schematic diagram 300 that illustrates an example comparison of activities between a churner and a collection of non-churners, in order to identify differences of performed activities The schematic diagram 300, or table or other data structure, includes an entry 310 for a churner (e.g., the former subscriber) and an entry 315 for a group of non-churners (e.g., retained subscribers associated with a cohort that includes the former subscriber). The diagram 300 provides columns of activities capable of being performed within the social network service 110, including a column 320 associated with an activity for viewing profiles within the social network service 110, a column 322 associated with sending messages within the social network service 110, a column 324 associated with an activity for performing searches within the social network service 110, and a column 326 associated with an average daily use of the social network service 110.

Based on the depicted comparison between activities of the churner and activities of the group of non-churners, the identification module 230 identifies differences in performed activities, such as differences associated with activities of sending messages, shown in column 322, within the social network service 110, and differences in usage levels, shown in column 326, of the social network service 110.

Of course, the diagram 300 may include other information not shown in FIG. 3, such as other activity types, performance levels of certain activities, and other information described herein and associated with activities performed by churners and non-churners within a social network service 110.

Referring back to FIG. 2, in some example embodiments, the action module 240 is configured and/or programmed to perform an action based on the identified one or more differences between the activity information associated with the former subscriber of the social network service 110 and the activity information associated with the subscribers of the social network service 110. For example, the action module 240 may perform an action associated with causing and/or prompting the former subscriber to perform the identified activity, such as by providing a recommendation and/or suggestion to the former subscriber to perform the identified activity, among other things.

The action module 240 may provide information or otherwise perform an action to the former subscriber in a variety of ways. For example, the action module 240 may present the former subscriber with a recommendation to perform an activity via a profile page associated with the former subscriber within the social network service 110 and/or via a direct message, either within or outside a social network, from the social network service 110 to the former subscriber, such as from the social network service 110 to the user device 140, among other communication paths.

Figure 4A:
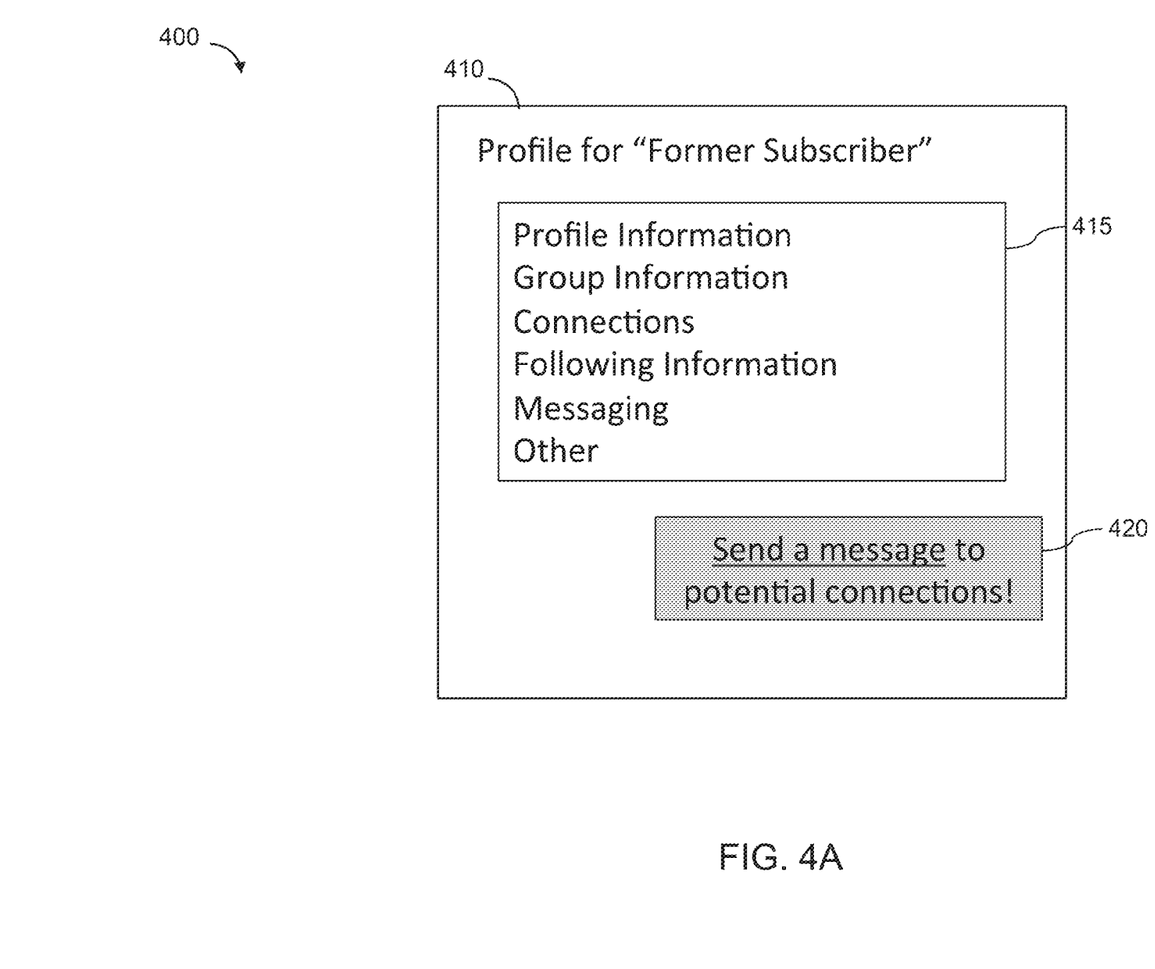
FIGS. 4A-4B are display diagrams illustrating the performance of an action associated with reducing a churn rate for a social network service, consistent with some embodiments.
Figure 4B:
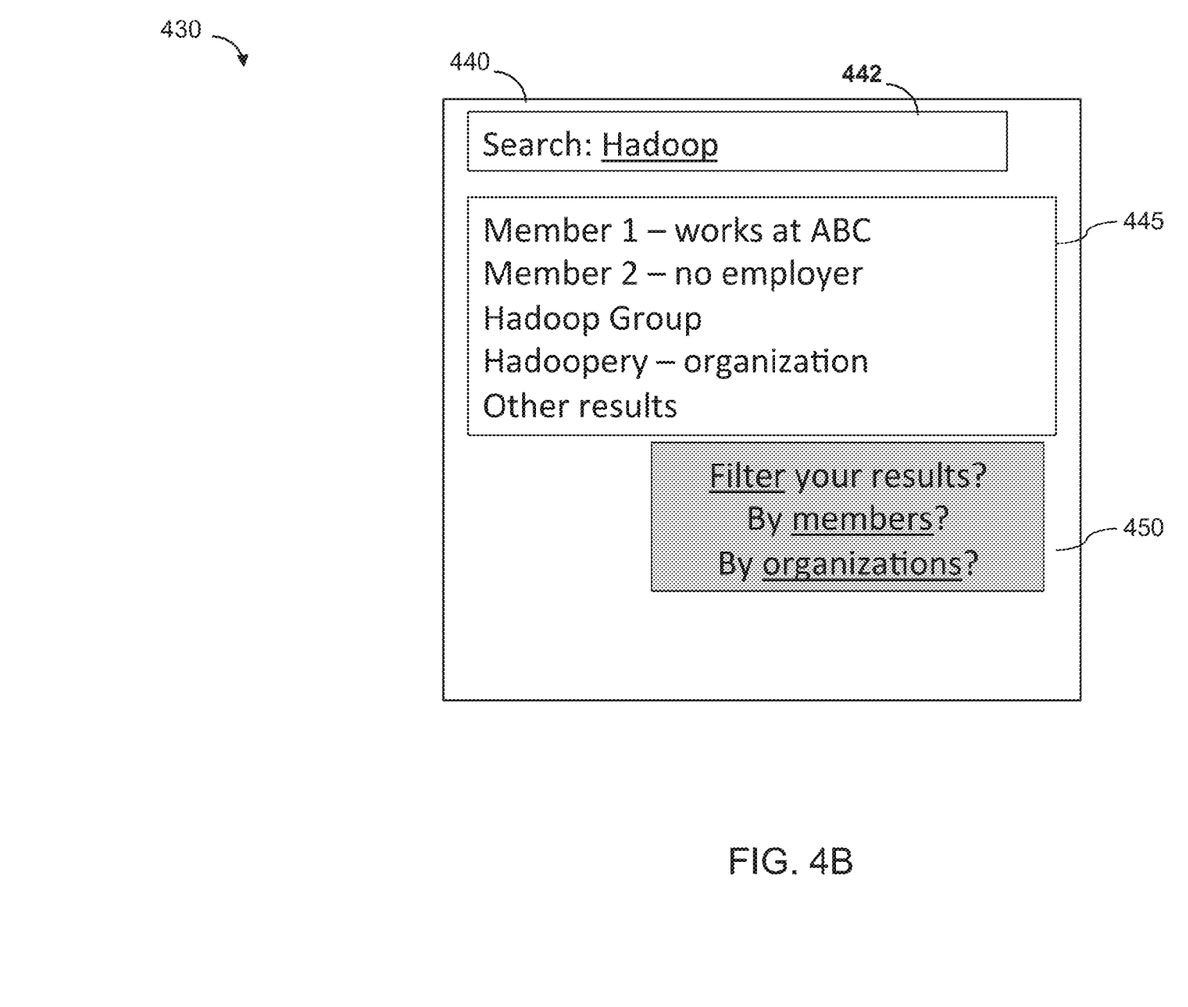

FIGS. 4A-4B are display diagrams illustrating the performance of an action associated with reducing a churn rate for a social network service 110, consistent with some embodiments.

For example, FIG. 4A depicts a user interface 400 presented by the user device 140 that displays a profile page 410 of the social network service 110 that is associated with the former subscriber. The profile page 410 displays various types of profile information 415 along with a recommendation 420 that may cause and/or prompt the former subscriber to perform an activity associated with non-churners, such as a recommendation reminding and/or providing information to the former subscriber that all messages are free under a subscription model. The recommendation 420 may present information as well as include actionable elements (e.g., links or buttons) in order to facilitate performance of the recommended activity and/or re-subscribing to the social network service 110 by the former subscriber, among other things.

As another example, FIG. 4B depicts a user interface 430 presented by the user device 140 that displays a search page 440 of the social network service 110 currently viewed by the former subscriber. The search page 440 displays search results 445 for a performed search 442 of "Hadoop." along with a suggestion 450 that may cause and/or prompt the former subscriber to perform an activity associated with non-churners, such as a suggestion to filter the search results presented to the former subscriber. The suggestion 450 may present information as well as include actionable elements (e.g., links or buttons) in order to facilitate the former subscriber to perform the recommended activity and/or to re-subscribe to the social network service 110, among other things.

Of course, other information and/or user interfaces may be rendered and/or presented by the action module 240.

Referring back to FIG. 2, in some example embodiments, the probability module 250 is configured and/or programmed to determine a churn probability for the subscriber of the social network service 110. For example, the probability module 250 may determine and/or calculate a metric or score to be assigned to a subscriber that identifies a churn or attrition probability for the subscriber at any time period during a subscription period associated with a service provided by the social network service 110, among other things.

The probability module 250 may determine a churn probability for a given subscriber in a variety of ways. For example, the probability module 250 may utilize a "churn meter" that is configured to receive, as input, information associated with a subscriber, and output a churn probability that the subscriber will churn and end the subscription (or, on the other hand, output a retention probability that the subscriber will retain the subscription).

Example input that may be utilized by the churn meter when determining a probability include profile information 415 for the subscriber (e.g., job title, seniority, years at title, and so on), activity information (e.g., the frequency and/or intensity of performed activities), time period information (e.g., when activities were performed), and so on.

The probability module 250, via the churn meter, may apply certain formulas and/or algorithms to input information in order to determine a churn probability for a certain subscriber at a certain point of time within a subscription period. For example, the probability module 250 may assign an importance or weight to certain features or activities based on various scoring formulas, such as the Fisher Score method, the Pearson Coefficient method, and other analytical methods. The probability module 250 may then calculate probabilities based on the scores, such as by using Relative Time Derivative methods, among other techniques.

For example, a churn curve may be defined as a logistic function, $$f(t) = \frac{1}{1 - e^{-t}}$$

The function may output a churn probability having a value between 0 and 1. Using the function, the churn meter may determined and/or calculate a churn probability for an individual subscriber by performing a simple vector product of each input variable (e.g. variables composed of raw and/or synthesized subscriber data from social networking services), with unique weights associated with each input variable. The churn probability, therefore, may be represented using the following formula:

$$P(\text{churn}) = \Sigma_0^i x_i y_i$$

where x is a vector array of input variables (from 0 to i), and y is a vector array of corresponding weights associated with each variable in vector x.

For example, the probability module 250 may provide input for a subscriber that indicates the subscriber has (1) performed very few searches within the last 30 days of his/her subscription, (2) sent no direct messages within the past 60 days, and (3) has a job title that is associated with a senior level position. The churn meter may receive such inputs and output a high churn probability (e.g., P(churn) =50% or higher).

Thus, in some example embodiments, the churn reduction system 150 may determine a churn probability for a subscriber of a service and then perform actions associated with the determined churn probability, among other things. The churn reduction system 150 may intake various subscriber data, such as demographic and behavioral data generated by a subscriber's usage of social networking services. Example date may include data uniquely available on social networking services, such as data associated with forming connections with other members, sharing and liking of content, and/or other social gestures that may be instrumented as raw variables and/or synthesized with temporal or other dimensional criteria to assess a subscriber's probability to churn.

Figure 5:
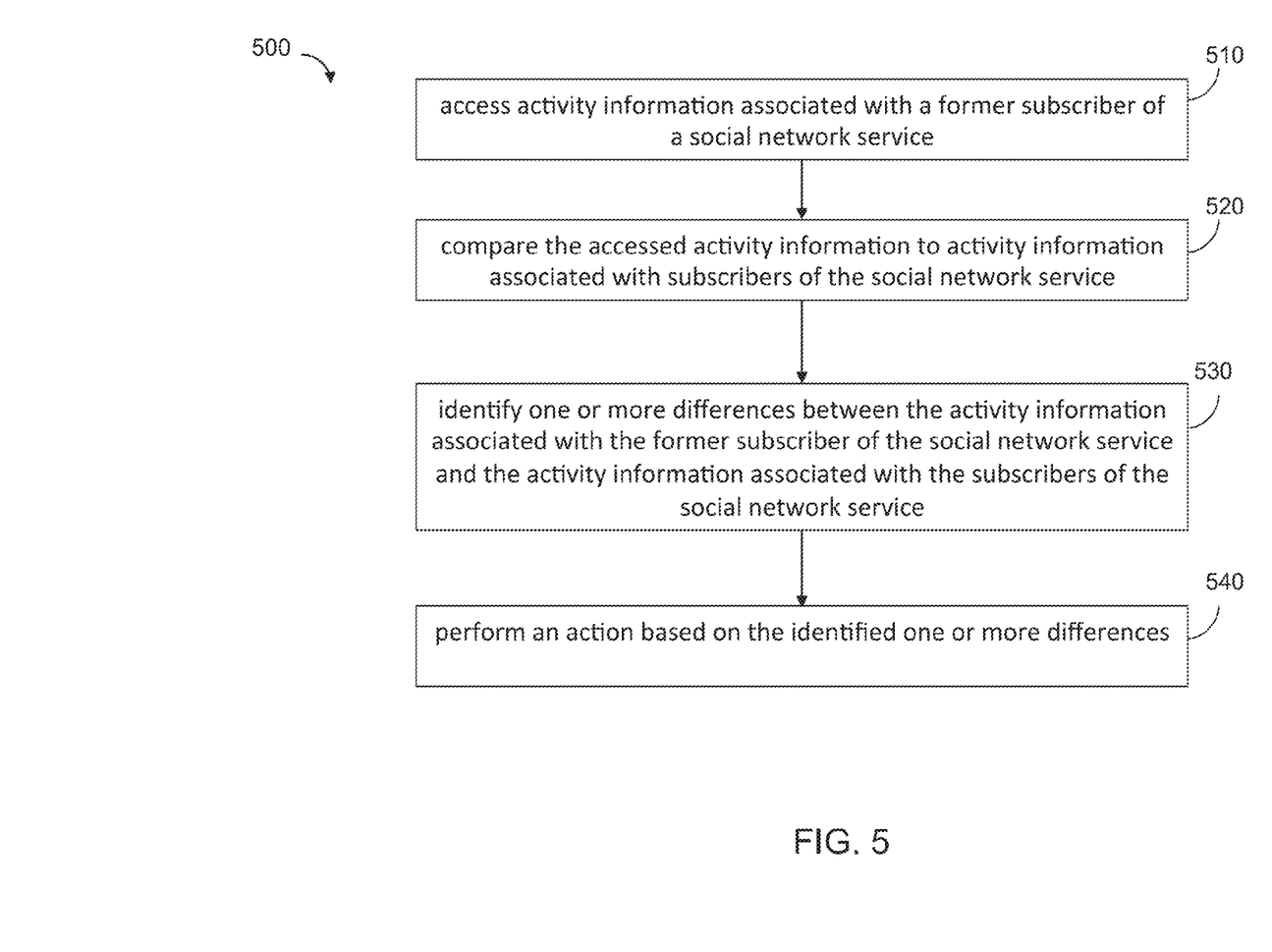
FIG. 5 is a flow diagram illustrating an example method for reducing a churn rate for a social network service, consistent with some embodiments.

As described herein, in some example embodiments, the churn reduction system 150 performs various methods and/or techniques in order to reduce and/or prevent churn rates associated with services provided by the social network service 110. FIG. 5 is a flow diagram illustrating an example method 500 for reducing a churn rate for a social network service 110, consistent with some embodiments. The method 500 may be performed by the churn reduction system 150 and, accordingly, is described herein merely by way of reference thereto. It will be appreciated that the method 500 may be performed on any suitable hardware.

In operation 510, the churn reduction system 150 accesses activity information associated with a former subscriber of a social network service 110. For example, the information module 210 accesses activity information associated with a former subscriber of subscription services 114 provided by the social network service 110.

In operation 520, the churn reduction system 150 compares the accessed activity information to activity information associated with subscribers of the social network service 110. For example, the comparison module 220 compares the accessed activity information to activity information associated with subscribers of the social network service 110 that are members of a same professional group and/or cohort within the social network service 110.

As described herein, the comparison module 220 may compare various activities performed (or not performed) by a former subscriber and other subscribers of the subscription services 114 provided by the social network service 110. Example comparisons include a comparison between a number of searches performed by the former subscriber within the social network service 110 to an average number of searches performed by subscribers of the social network service 110, a comparison between a number of profile views performed by the former subscriber within the social network 110 service to an average number of average profile views performed by subscribers of the social network service 110, a comparison between a number of messages sent by the former subscriber within the social network service 110 to an average number of messages sent by subscribers of the social network service 110, and so on.

In operation 530, the churn reduction system 150 identifies one or more differences between the activity information associated with the former subscriber of the social network service 110 and the activity information associated with the subscribers of the social network service 110. For example, the identification module 230 may identify an activity that was performed by the subscribers of the social network service 110 and was not performed by the former subscriber of the social network service 110, and/or an activity that was performed at a certain performance level by the subscribers of the social network service 110 and was not performed by the former subscriber of the social network service 110 at the certain performance level, among other things.

As described herein, the identification module 230 may identify various differences between activities performed by churners and non-churners. For example, the identification module 230 may identify an activity that was performed by the subscribers of the social network service during an initial subscription time period (or, other time periods) and was not performed by the former subscriber of the social network service during the initial subscription time period (or, other time periods), may identify an activity that was performed at a certain performance level by the subscribers of the social network service during an initial subscription time period and was not performed at the certain performance level by the former subscriber of the social network service during the initial subscription time period, and so on.

Thus, in some example embodiments, the identification module 230 identifies differences between the frequency and/or intensity of performance of an activity between former and current subscribers (e.g., churners and non-churners), among other things.

In operation 540, the churn reduction system 150 performs an action based on the identified one or more differences between the activity information associated with the former subscriber of the social network service 110 and the activity information associated with the subscribers of the social network service 110. For example the action module 240 performs an action associated with causing and/or prompting the former subscriber to perform the activity.

As described herein, the action module 240 may perform a variety of actions, such as provide recommendations or suggestions, associated with reducing a churn rate for a subscription service 114 provided by the social network service 110. For example, the action module 240 may present (or, cause to be presented) the former subscriber with a recommendation to perform an activity via a profile page associated with the former subscriber within the social network service 110, may present (or, cause to be presented) the former subscriber with a recommendation to perform an activity via a direct message from the social network service 110 to the former subscriber, and so on.

Thus, in some example embodiments, the churn reduction system 150 may receive information identifying a subscriber of a social network service 110 as a churner, determine an activity within the social network service 110 that was sub-standardly performed by the subscriber, and perform an action associated with causing and/or prompting the subscriber to perform the determined activity. For example, the churn reduction system 150 may determine that the subscriber identified as a churner performed the activity at a performance level below a performance level for the activity that was performed by other subscribers of the social network service identified as non-churners, and perform an action associated with that activity, among other things.

As described herein, the churn reduction system 150, in some example embodiments, may proactively identify potential churners by determining churn probabilities for some or all subscribers of the social network service 110. The churn reduction system 150 may perform actions based on the assigned probabilities, in order to reduce and/or prevent certain subscribers from churning or otherwise ending subscriptions to services, among other things.

Figure 6:
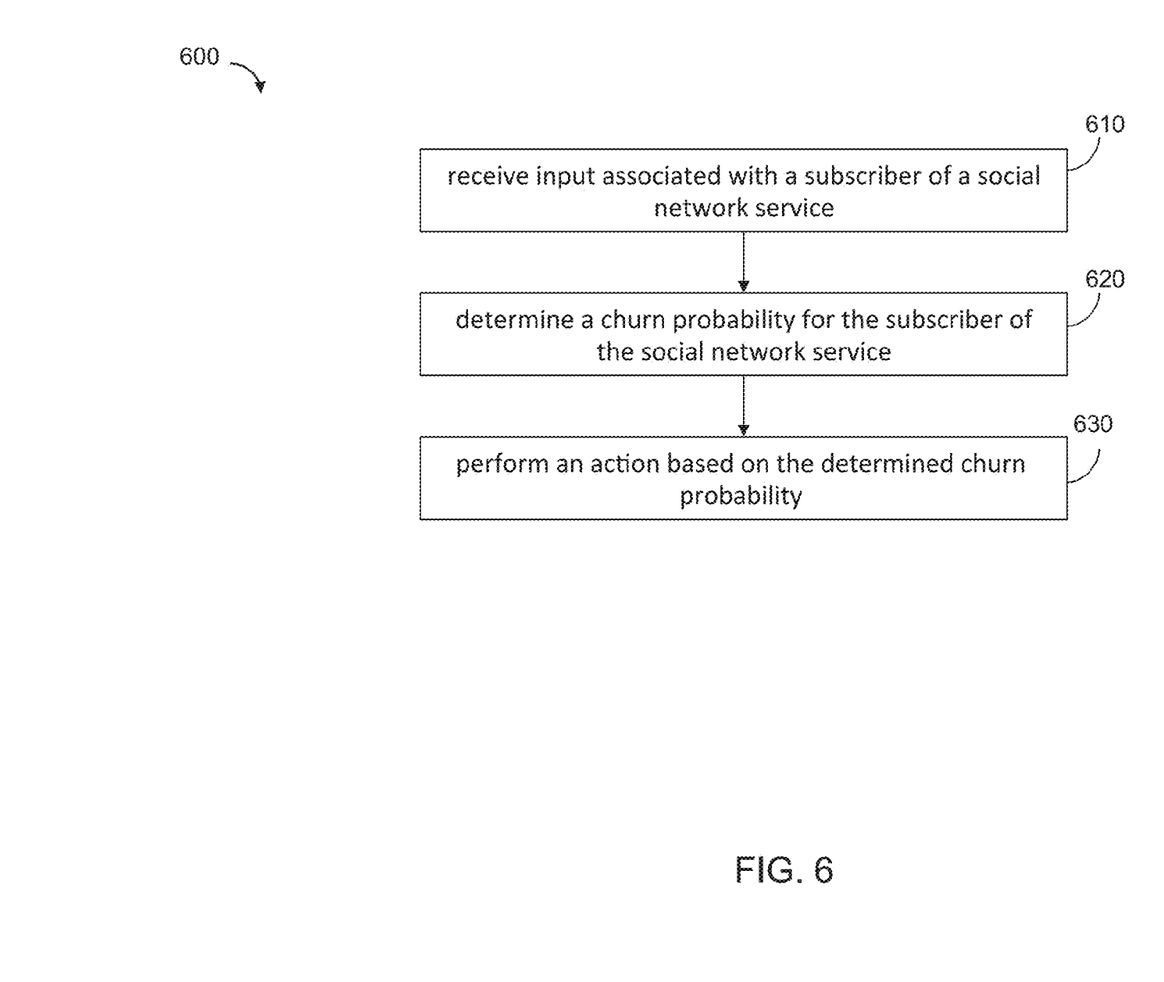
FIG. 6 is a flow diagram illustrating an example method for performing an action based on a churn probability associated with a subscriber of a social network service.

FIG. 6 is a flow diagram illustrating an example method 600 for performing an action based on a churn probability associated with a subscriber of social network service 110. The method 600 may be performed by the churn reduction system 150 and, accordingly, is described herein merely by way of reference thereto. It will be appreciated that the method 600 may be performed on any suitable hardware.

In operation 610, the churn reduction system 150 receives input associated with a subscriber of a social network service 110. For example, the information module 210 accesses and/or receives information associated with a subscriber of services 114 provided by the social network service 110, such as the information described herein.

In operation 620, the churn reduction system 150 determines a churn probability for the subscriber of the social network service 110. For example, the probability module 250 utilizes a churn meter to determine a probability to be assigned to the subscriber based on the information associated with the subscriber.

As described herein, the churn meter may assign weights and/or other values to various activities performed by the subscriber, and determine the churn probability based on the weighted activities. For example, the churn meter may weight searching for information within the social network service 110 and viewing profiles associated with members of the social network service 110 higher than sending messages to members of the social network service 110, and determine a probability based on the assigned weights.

In operation 630, the churn reduction system 150 performs an action based on the determined churn probability. For example, the action module 240 performs an action associated with causing and/or prompting the former subscriber to perform the activity. The action module 240 may perform a variety of actions, such as provide recommendations or suggestions associated with reducing a churn rate for a subscription service 114 provided by the social network service 110 and/or actions associated with causing the subscriber to perform an activity within the social network service 110.

For example, the action module 240 may present (or, cause to be presented) the former subscriber with a recommendation to perform an activity via a profile page associated with the former subscriber within the social network service 110, may present (or, cause to be presented) the former subscriber with a recommendation to perform an activity via a direct message from the social network service 110 to the former subscriber, and so on.

Thus, in some example embodiments, the churn reduction system 150 determines a retention probability to assign to a subscriber of a service that is based on activities provided by the service that are performed by the member, and performs an action associated with the determined retention probability. The retention probability may be based on a variety of factors, such as a performance level achieved by the subscriber for each of the activities provided by the service that are performed by the member, attributes associated with the subscriber, and so on.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules, engines, objects or devices that operate to perform one or more operations or functions. The modules, engines, objects and devices referred to herein may, in some example embodiments, comprise processor-implemented modules, engines, objects and/or devices.

Similarly, the methods described herein may be at least partially processor-implemented. For example, at least some of the operations of a method may be performed by one or more processors or processor-implemented modules. The performance of certain operations may be distributed among the one or more processors, not only residing within a single machine or computer, but deployed across a number of machines or computers. In some example embodiments, the processor or processors may be located in a single location (e.g., within a home environment, an office environment or at a server farm), while in other embodiments the processors may be distributed across a number of locations.

Figure 7:
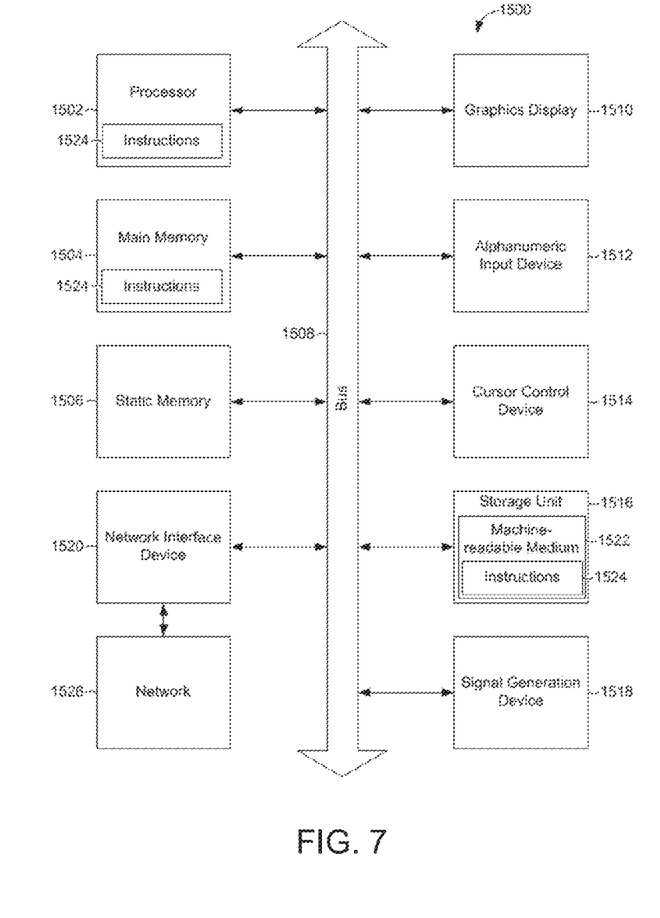
FIG. 7 is a block diagram of a machine, in the form of a computing device, within which a set of instructions for causing the machine to perform any one or more of the methodologies discussed herein, may be executed.

FIG. 7 is a block diagram of a machine 1500 in the form of a computer system 1500 or computing device within which a set of instructions 1524, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment. In some example embodiments, the machine will be a desktop computer or server computer; however, in alternative embodiments, the machine may be a tablet computer, a mobile phone, a personal digital assistant, a personal audio or video player, a global positioning device, a set-top box, a web appliance, or any machine capable of executing instructions 1524 (sequential or otherwise) that specify actions to be taken by that machine. Further, while only a single machine is illustrated, the term "machine" shall also be taken to include any collection of machines that individually or jointly execute a set (or multiple sets) of instructions 1524 to perform any one or more of the methodologies discussed herein.

The example computer system 1500 includes a processor 1502 (e.g., a central processing unit (CPU), a graphics processing unit (GPU) or both), a main memory 1504 and a static memory 1506, which communicate with each other via a bus 1508. The computer system 1500 may further include a graphics display unit 1510, an alphanumeric input device 1512 (e.g., a keyboard), and a user interface (UI) navigation device (e.g., a mouse). In one embodiment, the graphics display 1510, alphanumeric input device 1512 and cursor control device 1514 are a touch screen display. The computer system 1500 may additionally include a storage unit device 1516 (e.g., drive unit), a signal generation device 1518 (e.g., a speaker), a network interface device 1520, and one or more sensors, such as a global positioning system sensor, compass, accelerometer, or other sensor.

The storage unit 1516 includes a machine-readable medium 1522 on which is stored one or more sets of instructions 1524 and data structures (e.g., software) embodying or utilized by any one or more of the methodologies or functions described herein. The software 1523 may also reside, completely or at least partially, within the main memory 1504 and/or within the processor 1502 during execution thereof by the computer system 1500, the main memory 1504 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software may further be transmitted or received over a communications network 1526 using a transmission medium via the network interface device 1520 utilizing any one of a number of well-known transfer protocols (e.g., HTTP). Examples of communication networks 1526 include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions 1524 for execution by the machine, and includes digital or analog communications signals or other intangible medium to facilitate communication of such software.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A processor-implemented method performed by a processor-implemented churn reduction system, the method comprising:
    accessing, by the processor-implemented churn reduction system, activity information associated with a former subscriber of a social network service, wherein the former subscriber is a non-subscriber user of the social network service;
    comparing, by the processor-implemented churn reduction system, the accessed activity information to activity information associated with current subscribers of the social network service;
    identifying, by the processor-implemented churn reduction system, based on weights assigned to activities of the activity information associated with the former subscriber and the activity information associated with the current subscribers one or more differences between the activity information associated with the former subscriber of the social network service and the activity information associated with the current subscribers of the social network service; and
    performing, by the processor-implemented churn reduction system, an action based on the identified one or more differences between the activity information associated with the former subscriber of the social network service and the activity information associated with the current subscribers of the social network service, wherein the action comprises causing a portion of a webpage to be displayed on a screen of the former subscriber of the social network service to prompt the former subscriber to perform an activity to reduce the one or more differences between the activity information associated with the former subscriber and the activity information associated with the current subscribers.

2. The method of claim 1, wherein identifying one or more differences between the activity information associated with the former subscriber of the social network service and the activity information associated with the current subscribers of the social network service includes identifying an activity that was performed by the current subscribers of the social network service and was not performed by the former subscriber of the social network service; and
    wherein performing an action based on the identified one or more differences between the activity information associated with the former subscriber of the social network service and the activity information associated with the current subscribers of the social network service includes performing an action associated with causing the former subscriber to perform the activity.

3. The method of claim 1, wherein identifying one or more differences between the activity information associated with the former subscriber of the social network service and the activity information associated with the current subscribers of the social network service includes identifying an activity that was performed by the current subscribers of the social network service during an initial subscription time period and was not performed by the former subscriber of the social network service during the initial subscription time period; and
    wherein performing an action based on the identified one or more differences between the activity information associated with the former subscriber of the social network service and the activity information associated with the current subscribers of the social network service includes performing an action associated with causing the former subscriber to perform the activity.

4. The method of claim 1, wherein identifying one or more differences between the activity information associated with the former subscriber of the social network service and the activity information associated with the current subscribers of the social network service includes identifying an activity that was performed at a certain performance level by the current subscribers of the social network service during an initial subscription time period and was not performed at the certain performance level by the former subscriber of the social network service during the initial subscription time period; and
    wherein performing an action based on the identified one or more differences between the activity information associated with the former subscriber of the social network service and the activity information associated with the current subscribers of the social network service includes performing an action associated with causing the former subscriber to perform the activity.

5. The method of claim 1, wherein the former subscriber and the current subscribers of the social network service are members of a same professional group within the social network service.

6. The method of claim 1, wherein comparing the accessed activity information to activity information associated with current subscribers of the social network service includes comparing a number of searches performed by the former subscriber within the social network service to an average number of searches performed by the current subscribers of the social network service.

7. The method of claim 1, wherein comparing the accessed activity information to activity information associated with current subscribers of the social network service includes comparing a number of profile views performed by the former subscriber within the social network service to an average number of average profile views performed by the current subscribers of the social network service.

8. The method of claim 1, wherein comparing the accessed activity information to activity information associated with current subscribers of the social network service includes comparing a number of messages sent by the former subscriber within the social network service to an average number of messages sent by the current subscribers of the social network service.

9. The method of claim 1, wherein performing an action based on the identified one or more differences between the activity information associated with the former subscriber of the social network service and the activity information associated with the current subscribers of the social network service includes presenting the former subscriber with a recommendation to perform an activity via a profile page associated with the former subscriber within the social network service.

10. The method of claim 1, wherein performing an action based on the identified one or more differences between the activity information associated with the former subscriber of the social network service and the activity information associated with the current subscribers of the social network service includes presenting the former subscriber with a recommendation to perform an activity via a direct message from the social network service to the former subscriber.

11. A system, comprising:
a processor for executing instructions stored in a memory device;
at least one memory device storing instructions, said instructions collectively forming modules, the modules including:
an information module that is configured to access information associated with a former subscriber of a social network service, wherein the former subscriber is a non-subscriber user of the social network service;
a comparison module that is configured to compare the accessed activity information to activity information associated with current subscribers of the social network service;
an identification module that is configured to identify based on a weight assigned to activities of the activity information associated with the former subscriber and the activity information associated with the current subscribers one or more differences between the activity information associated with the former subscriber of the social network service and the activity information associated with the current subscribers of the social network service; and
an action module that is configured to perform an action based on the identified one or more differences between the activity information associated with the former subscriber of the social network service and the activity information associated with the current subscribers of the social network service, wherein the action comprises causing a portion of a webpage to be displayed on a screen of the former subscriber of the social network service to prompt the former subscriber to perform an activity to reduce the one or more differences between the activity information associated with the former subscriber and the activity information associated with the current subscribers.

12. The system of claim 11, wherein the identification module is configured to identify an activity that was performed by the current subscribers of the social network service and was not performed by the former subscriber of the social network service; and
wherein the action module is configured to perform an action associated with causing the former subscriber to perform the activity.

13. The system of claim 11, wherein the identification module is configured to identify an activity that was performed by the current subscribers of the social network service during an initial subscription time period and was not performed by the former subscriber of the social network service during the initial subscription time period; and
wherein the action module is configured to perform an action associated with causing the former subscriber to perform the activity.

14. The system of claim 11, wherein the identification module is configured to identify an activity that was performed at a certain performance level by the current subscribers of the social network service during an initial subscription time period and was not performed at the certain performance level by the former subscriber of the social network service during the initial subscription time period; and
wherein the action module is configured to perform an action associated with causing the former subscriber to perform the activity.

15. The system of claim 11, wherein the action module is configured to present the former subscriber with a recommendation to perform an activity via a profile page associated with the former subscriber within the social network service.

16. The system of claim 11, wherein the action module is configured to present the former subscriber with a recommendation to perform an activity via a direct message from the social network service to the former subscriber.

17. The system of claim 11, wherein the comparison module is configured to compare a number of searches performed by the former subscriber within the social network service to an average number of searches performed by the current subscribers of the social network service.

18. The system of claim 11, wherein the comparison module is configured to compare a number of profiles visited by the former subscriber within the social network service to an average number of profiles visited by the current subscribers of the social network service.

19. A non-transitory computer-readable storage medium whose contents, when executed by a computing system, cause the computing system to perform operations, comprising:
receiving information identifying a subscriber of a social network service as a churner,
determining based on a weight assigned to activities an activity within the social network service that was sub-standardly performed by the subscriber; and
performing an action associated with causing the subscriber to perform the determined activity, wherein the action comprises causing a portion of a webpage to be displayed on a screen of the subscriber to prompt the subscriber to perform the activity.

20. The computer-readable storage medium of claim 19, wherein determining an activity within the social network service that was sub-standardly performed by the subscriber includes determining that the subscriber, identified as a churner, performed the activity at a performance level below a performance level for the activity that was performed by other subscribers of the social network service identified as current subscribers.

* * * * *